US012713292B2

(12) United States Patent
Rahman

(10) Patent No.: US 12,713,292 B2
(45) **Date of Patent: *Aug. 18, 2026**

(54) ADAPTIVE PAYLOAD SIZES FOR STREAMING DATA DELIVERY BASED ON USAGE PATTERNS

(71) Applicant: T-Mobile USA, Inc., Bellevue, WA (US)

(72) Inventor: Muhammad Tawhidur Rahman, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 363 days.

This patent is subject to a terminal disclaimer.

(21) Appl. No.: 18/443,550

(22) Filed: Feb. 16, 2024

(65) Prior Publication Data

US 2024/0187925 A1 Jun. 6, 2024

Related U.S. Application Data

(63) Continuation of application No. 17/500,623, filed on Oct. 13, 2021, now Pat. No. 11,910,236.

(51) Int. Cl.
*H04W 28/06* (2009.01)
*H04N 21/414* (2011.01)
(Continued)

(52) U.S. Cl.
CPC ...... *H04W 28/06* (2013.01); *H04N 21/41407* (2013.01); *H04N 21/44204* (2013.01); *H04N 21/4622* (2013.01)

(58) Field of Classification Search
CPC .. H04W 28/06; H04W 4/18; H04N 21/41407; H04N 21/44204;
(Continued)

(56) References Cited

U.S. PATENT DOCUMENTS 6,628,615 B1 9/2003 Joseph et al.
7,020,082 B2 3/2006 Bhagavath et al.
(Continued)

FOREIGN PATENT DOCUMENTS

CN 101523812 B 2/2014
CN 102640525 B 12/2016
CN 108055553 B 6/2019

OTHER PUBLICATIONS

Extended Search Report for European Patent Application No. 22881671.6 dated Feb. 19, 2025, pp. 10.
(Continued)

*Primary Examiner* — Vinncelas Louis
(74) *Attorney, Agent, or Firm* — Ashurst Perkins Coie US LLP

(57) ABSTRACT

Methods, devices, and system related to adaptive determination of payload sizes based on usage patterns of the contents are disclosed. In one example aspect, an apparatus for wireless communication includes a processor that is configured to transmit a first data packet associated with a first network content to a user device, receive a request from the user device indicating a switch to a second network content from the first network content, determine a usage pattern associated with the first network content based on information included in at least the first data packet and the request, and adaptively change, based on the usage pattern, a payload size of a second data packet associated with a subsequent transmission of the first network content.

18 Claims, 5 Drawing Sheets

(51) Int. Cl.
*H04N 21/442* (2011.01)
*H04N 21/462* (2011.01)

(58) Field of Classification Search
CPC ......... H04N 21/4622; H04N 21/64322; H04N 21/64792; H04L 65/1016; H04L 65/612; H04L 65/756; H04L 65/764; H04L 67/02; H04L 63/102
See application file for complete search history.

(56) References Cited

U.S. PATENT DOCUMENTS 7,072,296 B2 7/2006 Turner et al.
7,079,501 B2 7/2006 Boivie
7,177,628 B2 2/2007 Sommers et al.
7,440,439 B2 10/2008 Johansson et al.
7,583,953 B2 9/2009 Choi et al.
7,664,879 B2 2/2010 Chan et al.
7,725,934 B2 5/2010 Kumar et al.
7,843,831 B2 11/2010 Morrill et al.
7,940,735 B2 5/2011 Kozisek et al.
7,983,216 B2 7/2011 Iyer et al.
7,987,272 B2 7/2011 Kumar et al.
8,107,366 B2 1/2012 Wiley et al.
8,130,793 B2 3/2012 Edwards et al.
8,199,653 B2 6/2012 Bugenhagen et al.
8,274,905 B2 9/2012 Edwards et al.
8,352,628 B2 1/2013 Maruccia et al.
8,375,277 B2 2/2013 Koster et al.
8,397,065 B2 3/2013 Lin et al.
8,532,124 B2 9/2013 Satterlee et al.
8,549,405 B2 10/2013 Bugenhagen et al.
8,693,358 B2 4/2014 Hodges
8,755,405 B2 6/2014 Kovvali et al.
8,843,598 B2 9/2014 Singhal et al.
8,964,715 B2 2/2015 Hanson et al.
9,137,700 B2 9/2015 Elefant et al.
9,143,575 B2 9/2015 Cao et al.
9,386,077 B2 7/2016 Kotecha
9,414,200 B2 8/2016 Chowdhury et al.
9,445,302 B2 9/2016 Vos et al.
9,544,709 B2 1/2017 Jain et al.
9,648,173 B2 5/2017 Cheuk et al.
9,674,145 B2 6/2017 Chien
9,716,635 B2 7/2017 Tal et al.
9,749,252 B2 8/2017 Katar et al.
9,807,592 B2 10/2017 Ramamurthi et al.
9,819,592 B2 11/2017 Meredith et al.
9,906,838 B2 * 2/2018 Cronk .................. H04L 63/102
9,930,012 B1 3/2018 Clemons et al.
9,998,909 B2 6/2018 Olsson et al.
10,097,699 B2 10/2018 Girard et al.
10,349,313 B2 7/2019 Chen et al.
2003/0086395 A1 5/2003 Shanbhag
2003/0145106 A1 7/2003 Brown
2004/0008650 A1 1/2004 Le et al.
2008/0004957 A1 1/2008 Hildreth et al.
2008/0052206 A1 2/2008 Edwards et al.
2008/0306816 A1 12/2008 Matthys et al.
2009/0198579 A1 8/2009 Lewis et al.
2012/0290739 A1 11/2012 Melnyk et al.
2015/0009825 A1 1/2015 Cha
2015/0113576 A1 4/2015 Carroll
2015/0146552 A1 5/2015 Majmundar et al.
2017/0289212 A1 10/2017 Lee et al.
2019/0320479 A1 10/2019 Choudhary et al.
2020/0412787 A1 12/2020 Pichaimurthy et al.
2021/0306278 A1 9/2021 Sivaraj et al.
2025/0159038 A1 * 5/2025 Shribman ............... H04L 67/02

OTHER PUBLICATIONS

International Search Report and Written Opinion, PCT Patent Application PCT/US2022/046319, mailed Feb. 2, 2023, 10 pages.

* cited by examiner

350 request a first network content

360 receive a first data packet with an adaptively determined payload size

ADAPTIVE PAYLOAD SIZES FOR STREAMING DATA DELIVERY BASED ON USAGE PATTERNS

CROSS-REFERENCE TO RELATED APPLICATIONS

This application is a continuation of U.S. patent application Ser. No. 17/500,623, filed on Oct. 13, 2021, entitled ADAPTIVE PAYLOAD SIZES FOR STREAMING DATA DELIVERY BASED ON USAGE PATTERNS, which is hereby incorporated by reference in its entirety.

BACKGROUND

With the development of video streaming and online gaming services, adaptive transmission of streaming data has been introduced to efficiently deliver contents to users under different circumstances.

BRIEF DESCRIPTION OF THE DRAWINGS

Detailed descriptions of implementations of the present invention will be described and explained through the use of the accompanying drawings.

FIG. 3B is a flowchart representation of another method for wireless communication in accordance with one or more embodiments.

Figure 1:
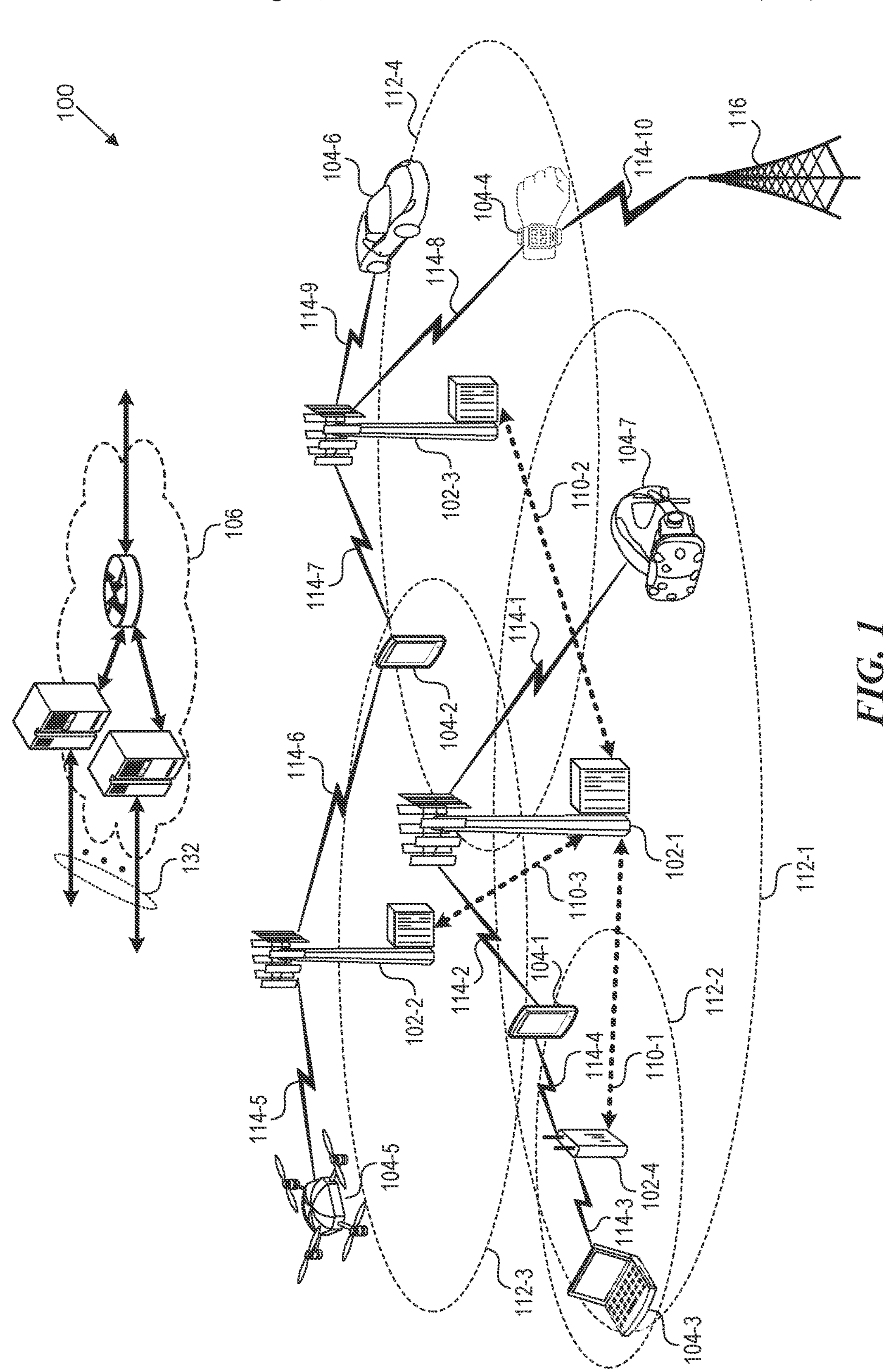
FIG. 1 is a block diagram that illustrates a wireless telecommunication system in which aspects of the disclosed technology are incorporated.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

In recent years, mobile streaming services has gain tremendous popularity. Currently, most video streaming is performed over Hypertext Transfer Protocol (HTTP). HTTP-based adaptive video streaming has been standardized as Dynamic Adaptive Streaming over HTTP (DASH). In DASH systems, each video is encoded into streams of multiple discrete bitrates and each stream is cut into multiple chunks (e.g., 2-10 seconds of video time). A client-side video player can adopt the bitrate adaptation algorithm to dynamically pick the bitrate level according to the perceived network conditions.

The current DASH approaches mainly focus on the varying bandwidth in determining bitrate adaptation. However, the existing approaches fail to take into account the impact of users' usage patterns. For example, certain users may switch among different streaming services or a large amount of content without actually viewing the content. Because the same payload/chunk size is applicable to users having similar network conditions, resources are typically wasted for transmitting video data that is ultimately discarded. This patent document discloses techniques that can be implemented in various embodiments to track user connection information so as to model different usage patterns and provide different payload sizes according to the usage patterns, thereby minimizing network resource wastage and providing efficient streaming services to users.

Wireless Communications System

FIG. 1 is a block diagram that illustrates a wireless telecommunication system 100 ("system 100") in which aspects of the disclosed technology are incorporated. The system 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The system 100 can include any combination of NANs including an access point, radio transceiver, gNodeB (gNB), NodeB, eNodeB (eNB), Home NodeB or eNodeB, or the like. In addition to being a WWAN base station, a NAN can be a WLAN access point, such as an Institute of Electrical and Electronics Engineers (IEEE) 802.11 access point.

The NANs of a network formed by the system 100 also include wireless devices 104-1 through 104-8 (referred to individually as "wireless device 104" or collectively as "wireless devices 104") and a core network 106. The wireless devices 104-1 through 104-8 can correspond to or include network entities capable of communication using various connectivity standards. For example, a 5G communication channel can use millimeter wave (mmW) access frequencies of 28 GHz or more. In some implementations, the wireless device 104 can operatively couple to a base station 102 over a Long-Term Evolution (LTE)/LTE Advanced (LTE-A) communication channel, which is referred to as a 4G communication channel. In some implementations, the base station 102 can provide network access to a Fifth-Generation (5G) communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links 108 (e.g., S1 interfaces) and can perform radio configuration and scheduling for communication with the wireless devices 104 or can operate under the control of a base station controller (not shown). In some examples, the base stations 102 can communicate, either directly or indirectly (e.g., through the core network 106), with each other over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown).

The system 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC)), etc.

The system 100 can include a 5G network and/or an LTE/LTE-A or other network. In an LTE/LTE-A network, the term eNB is used to describe the base stations 102 and in 5G new radio (NR) networks, the term gNBs is used to describe the base stations 102 that can include mmW communications. The system 100 can thus form a heterogeneous network in which different types of base stations provide coverage for various geographical regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices with service subscriptions with a wireless network service provider. As indicated earlier, a small cell is a lower-powered base station, as compared with a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices with service subscriptions with the network provider. A femto cell covers a relatively smaller geographic area (e.g., a home) and can provide restricted access by wireless devices having an association with the femto cell (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

As illustrated, the wireless devices 104 are distributed throughout the system 100, where each wireless device 104 can be stationary or mobile. A wireless device can be referred to as a mobile station, a subscriber station, a mobile unit, a subscriber unit, a wireless unit, a remote unit, a handheld mobile device, a remote device, a mobile subscriber station, an access terminal, a mobile terminal, a wireless terminal, a remote terminal, a handset, a mobile client, a client, or the like. Examples of a wireless device include user equipment (UE) such as a mobile phone, a personal digital assistant (PDA), a wireless modem, a handheld mobile device (e.g., wireless devices 104-1 and 104-2), a tablet computer, a laptop computer (e.g., wireless device 104-3), a wearable (e.g., wireless device 104-4). A wireless device can be included in another device such as, for example, a drone (e.g., wireless device 104-5), a vehicle (e.g., wireless device 104-6), an augmented reality/virtual reality (AR/VR) device such as a head-mounted display device (e.g., wireless device 104-7), an IoT device such as an appliance in a home (e.g., wireless device 104-8), a portable gaming console, or a wirelessly connected sensor that provides data to a remote server over a network.

A wireless device can communicate with various types of base stations and network equipment at the edge of a network including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-11 (also referred to individually as "communication link 114" or collectively as "communication links 114") shown in system 100 include uplink (UL) transmissions from a wireless device 104 to a base station 102, and/or downlink (DL) transmissions, from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using FDD (e.g., using paired spectrum resources) or TDD operation (e.g., using unpaired spectrum resources). In some implementations, the communication links 114 include LTE and/or mmW communication links.

In some implementations of the system 100, the base stations 102 and/or the wireless devices 104 include multiple antennas for employing antenna diversity schemes to improve communication quality and reliability between base stations 102 and wireless devices 104. Additionally, or alternatively, the base stations 102 and/or the wireless devices 104 can employ multiple-input, multiple-output (MIMO) techniques that can take advantage of multi-path environments to transmit multiple spatial layers carrying the same or different coded data.

Payload Control Based on Usage Patterns

Figure 2:
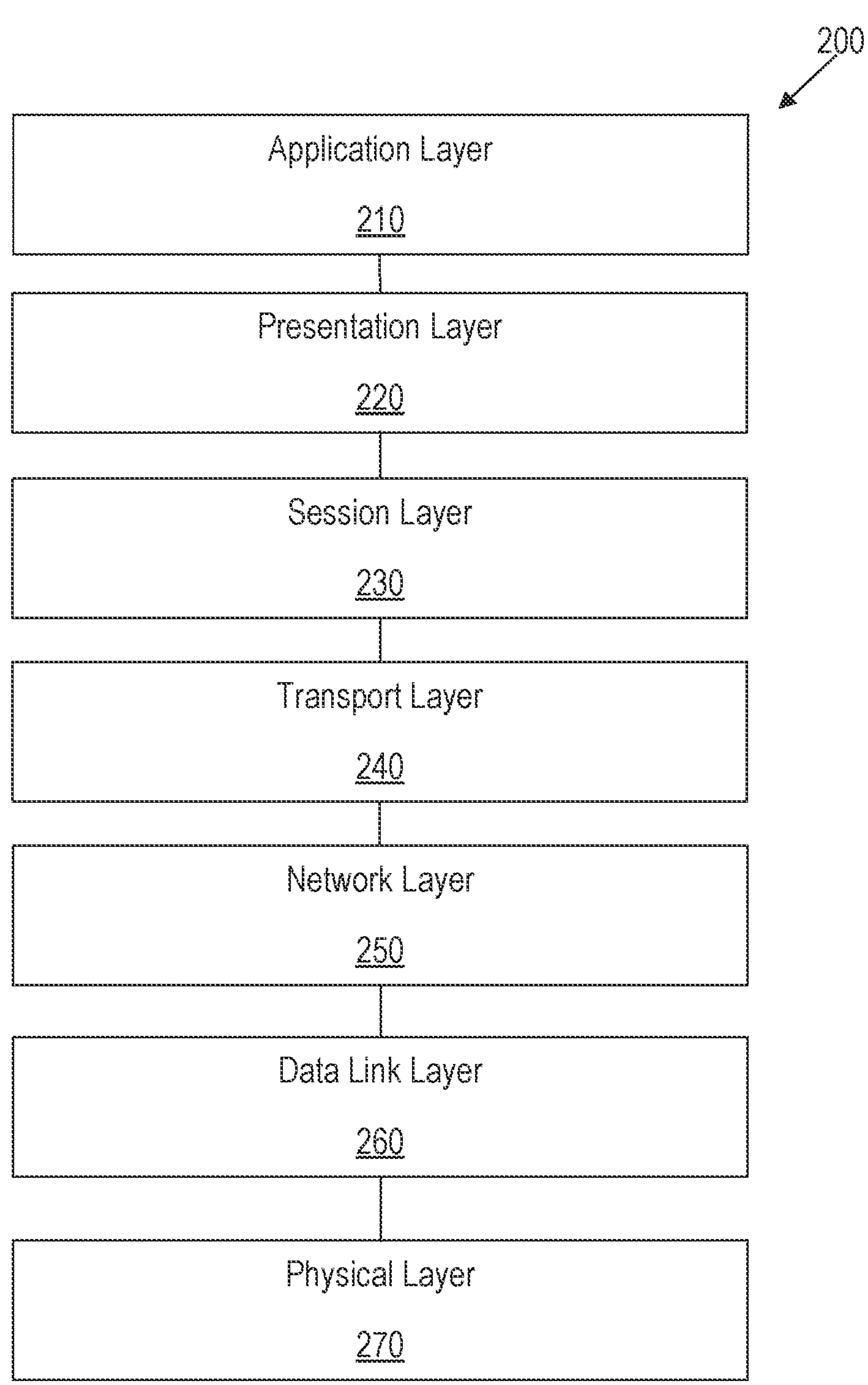
FIG. 2 illustrates an Open System Interconnection model (OSI) model that standardizes the communication layers of a telecommunication or computing system.

To provide streaming services to users, service contents traverse across different layers of the network and are handled by different network devices, including the base station(s) 102 and the core network 106 as illustrated in FIG. 1. FIG. 2 illustrates an Open System Interconnection model (OSI) model that standardizes the communication layers of a telecommunication or computing system. For example, streaming requests at the application layer 210 are translated into network packets at lower layers (e.g., the transport layer 240). Streaming data is carried in data packets according to the protocols, such as the Transmission Control Protocol (TCP) or the User Datagram Protocol (UDP). The packets also carry information about the source (e.g., source port) and the destination (e.g., destination port) that facilitate the transmission.

The bitrate adaptation algorithm in DASH systems determines the appropriate bit rate level for the chunks to be delivered to the users. If the bitrate is too high, the chunks may not be delivered in time, resulting in rebuffering events (e.g., the video play pauses because the playback buffer is empty). If the bitrate is too low, the available bandwidth may not be fully utilized, resulting in waste in network resources and lower video quality to the users. Different techniques have been developed overtime to provide better viewing experiences to users. For example, to reduce the number of rebuffering events, several chunks of data can be pre-loaded in the buffer before the streaming begins. Having additional chunks of video data available in the buffer can greatly reduce the likelihood of encountering rebuffering events. However, buffering additional chunks of video data can lead to wastage of network resources when the user frequently switches between different streaming services and/or video contents offered by a video streaming service.

To reduce or minimize such waste of network resources, this patent document discloses techniques whereby the core network can be configured to track network connection information and build statistical models that reflect the user usage pattern for consuming certain types of contents. The statistical models can further assist the core network to adaptively adjust the payload sizes according to user usages, thereby minimizing network resource wastage and providing efficient streaming services to different users. For example, smaller payload sizes can be used for users who tend to switch between contents often so as to minimize wastage of network resources. For users who tend to view the same content for a long period of time, larger payload sizes can be used to reduce rebuffering events to provide better viewing experiences. Using the disclosed techniques, the network operator can gain optimal utilization of its network capacity and provide better video service for more customers.

In some embodiments, network nodes such as the User Plane Function (UPF) and/or the Session Management Function (SMF) in the core network can examine the timestamps of the data packets to determine the start and end time of a connection to a particular streaming service and/or transmission of the streaming service content. The collected data is then analyzed to model usage pattern and predict whether fast switching of the contents is likely to occur. Based on the analysis results, the core network can adaptively change the payload size of streaming data transmission notwithstanding the bitrate level or chunk size used by the client-side video player, leading to optimal delivery of the video content that is suitable for users' needs. For example, the number of pre-loaded chunks or the size of the pre-loaded chunks can be reduced if the user is likely to switch among different contents quickly. As another example, the number of pre-loaded chunks or the size of the pre-loaded chunks can be increased if the user is likely to stay with the same service, leading to fewer rebuffering events and better viewing experience.

Figure 3A:
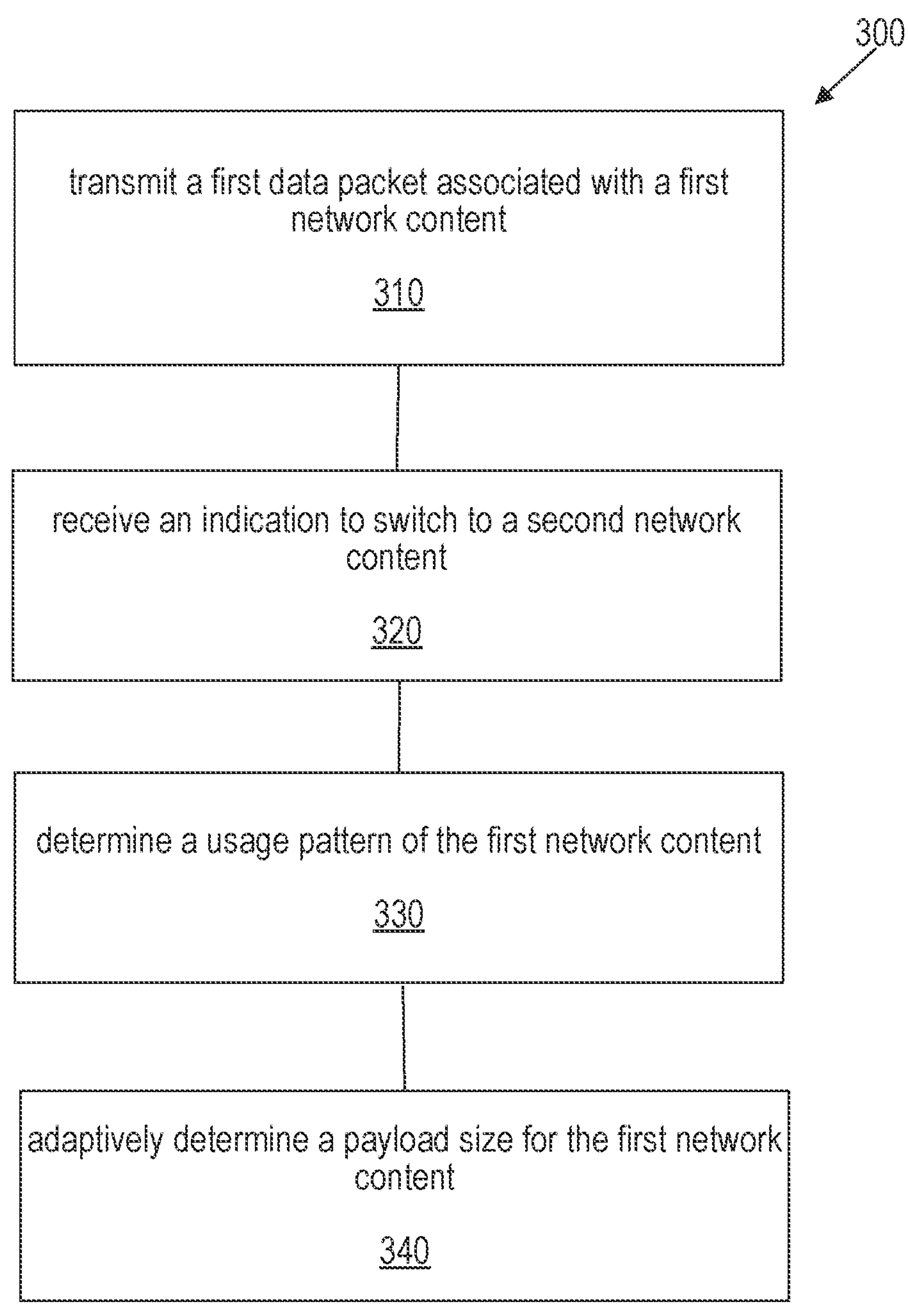
FIG. 3A is a flowchart representation of a method for wireless communication in accordance with one or more embodiments.

FIG. 3A is a flowchart representation of a method for wireless communication in accordance with one or more embodiments. The method 300 includes, at operation 310, transmitting, by a network node, a first data packet to a user device. The first data packet is associated with a first network content (e.g., a first video). The method 300 includes, at operation 320, receiving, by the network node, a request from the user device indicating a switch to a second network content (e.g., a second video) from the first network content. The method 300 includes, at operation 330, determining, by the network node, a usage pattern associated with the first network content based on information associated with at least the first data packet and the request. The method 300 also includes, at operation 340, adaptively determining, by the network node based on the usage pattern, a payload size of a second data packet associated with a subsequent transmission of the first network content.

When the user switches between different streaming services at the application layer, the requests can be translated into socket closing and creation calls as different streaming service providers are associated with different server addresses. Content switches within the same video streaming service can be detected based on the Uniform Resource Locator (URL) changes of the contents. Therefore, the core network can collect information that indicates the usage pattern of the user based on data packets transmitted at lower layer(s). In some embodiments, the data packets include timestamps associated with the respective network contents. The socket creation/closing requests can also be associated with timestamps indicating the usage or termination of the respective network contents or services. In some embodiments, the method includes performing statistical analysis using the timestamps. For example, the statistical analysis includes determining a minimal usage duration, a maximum usage duration, a mean usage duration, a median usage duration, and/or an average usage duration of the network content and/or the streaming service by the user device.

In some embodiments, the core network can define a tracking window for collecting information related to the user behavior. The tracking window can be a day, a week, or even a month. Various types of data can be collected within the tracking window. The algorithms that analyze the collected information can be adaptively updated periodically (e.g., based on the tracking window and/or the predicted usage pattern) to provide a more accurate modeling of the user behavior.

In some embodiments, the first network content is associated with a first streaming service (e.g., Netflix), and the second network content is associated with a second streaming service (e.g., Disney+). The payload size can be adaptively changed in response to the first streaming service and the second streaming service being different services. In some embodiments, different categories of services can be analyzed. For example, the first network content is associated with a gaming service, and the second network content is associated with a video streaming service. The payload size can be different in response to the different categories of services.

Figure 3B:
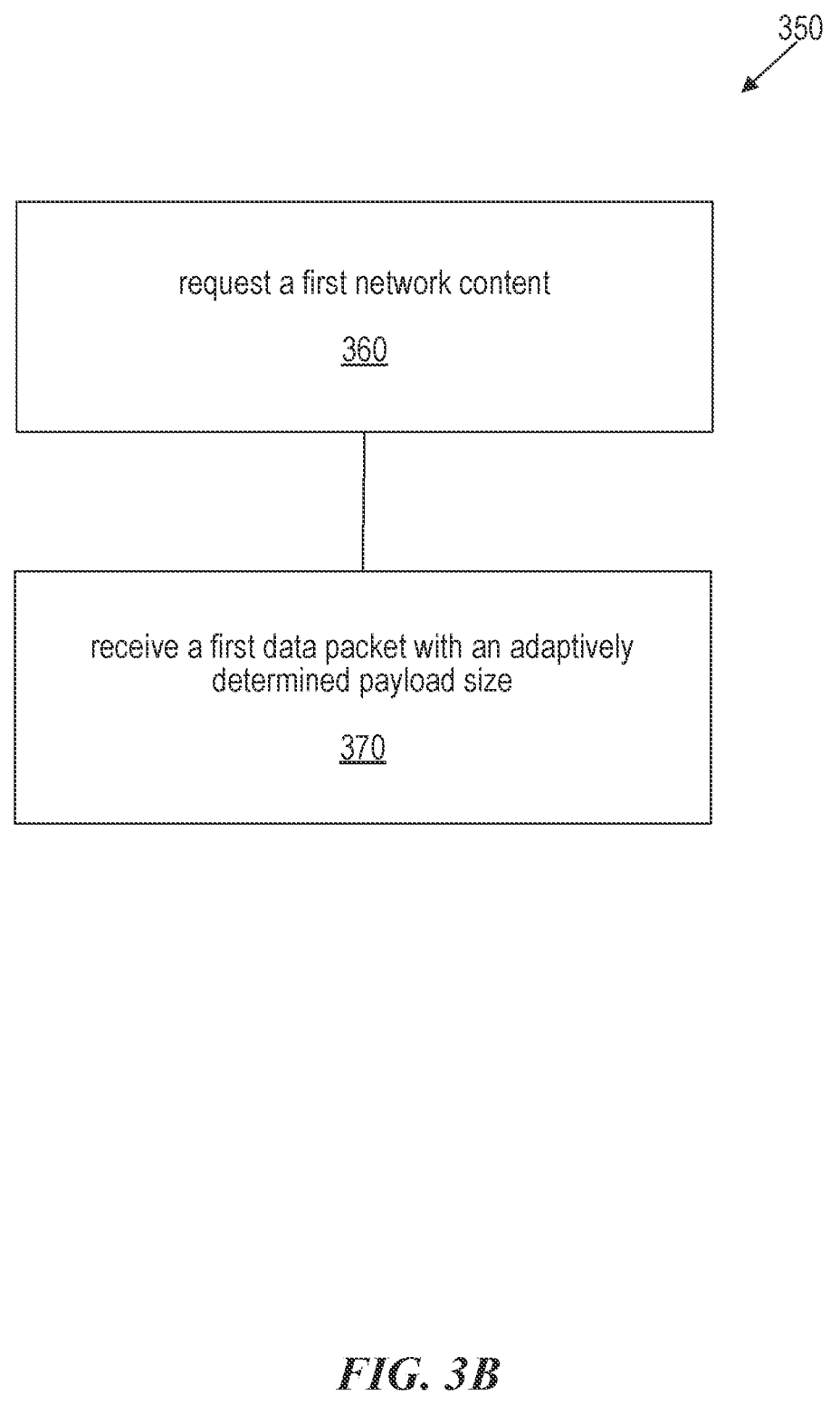

FIG. 3B is a flowchart representation of a method for wireless communication in accordance with one or more embodiments. The method 350 includes, at operation 360, transmitting, by the user device, a request to the network node requesting a first network content. The request can include information about an initial payload size of a first data packet associated with the first network content based on a network condition associated with reception of data packets from the network node. The method 350 includes, at operation 370, receiving, by the user device, a first data packet associated with the first network content. A payload size of the first data packet is adaptively determined based on usage data associated with the first network content, and the usage data is determined based on information collected from the user device during a tracking window. The initial payload size is different than the payload size adaptively determined based on the usage data In some embodiments, the method includes transmitting, by the user device, a second request to the network node requesting a second network content. The method also includes receiving, by the user device, a second data packet associated with the second network content. A second payload size of the second data packet can be adaptively determined based on usage data associated with the second network content. For example, the first network content is associated with a first service (e.g., Netflix or a gaming service), and the second network content is associated with a second service (e.g., Disney+ or Amazon Prime). The second payload size is different than the payload size in response to the first service and the second service being different services.

Table 1 shows example connection time that can be tracked by the core network in accordance with one or more embodiments of the present technology. The timestamps can be either included in the data packets, the socket creation/closing requests, or be determined by the core network. Based on the tracked connection time within the tracking window, the core network can build one or more statistical models that represent how often the user switches between different streaming services. In some embodiments, the core network can determine the minimum amount of connection time, the maximum amount of connection time, and/or the mean/median/average amount of connection time of a particular host, thereby calculating a statistical metric (e.g., the average) amount of time the user spends on a particular streaming service before switching to a different service.

TABLE 1

Example Connection Time Associated with Hosts

| Host address | Connection bind time | Socket close time |
|---|---|---|
| www.news.com | 16:25:03 | 16:25:11 |
| www.watch.com | 16:25:23 | 16:25:54 |
| www.channel.com | 16:28:03 | 16:28:05 |
| www.watch.com | 16:28:23 | 16:30:54 |
| . . . | | |
| www.video.com | 21:10:06 | 22:36:12 |

Table 2 shows example connection time of different URLs that can be tracked by the core network in accordance with one or more embodiments of the present technology. Based on the tracked connection time within the tracking window, the core network can build one or more statistical models that represent how often the user switches between different video contents of the same or different services. In some embodiments, the core network can determine the minimum amount of connection time, the maximum amount of connection time, and/or the mean/median/average amount of connection time to a particular host, thereby calculating a statistical metric (e.g., the average) amount of time the user spends per video before switching to a different video.

TABLE 2

Example Connection Time Associated with URLs

| URL | Start time | End time |
|---|---|---|
| www.news.com/Z7pgn6FMVWM | 13:21:08 | 13:25:11 |
| www.news.com/hyiGCNwCMxU | 14:25:12 | 14:25:47 |
| www.watch.com/m3g51xfopIE | 19:41:02 | 20:13:05 |
| www.video.com/1Q-5eIBfBDQ | 22:27:36 | 23:51:07 |

Table 3 shows example connection time of different URLs associated with a particular host or application that can be tracked by the core network in accordance with one or more embodiments of the present technology. Based on the tracked connection time within the tracking window, the core network can build one or more statistical models that represent how often the user switches between different video contents of the same streaming service. In some embodiments, the core network can determine the minimum amount of connection time, the maximum amount of connection time, and/or the mean/median/average amount of connection time of a video of a particular streaming service, thereby calculating a statistical metric (e.g., the average) amount of time the user spends per video before switching to a different video of the same service.

TABLE 3

Example Connection Time Associated with Hosts and URLs

| Host | URL | Start time | End time |
|---|---|---|---|
| www.news.com | Z7pgn6FMVWM | 13:21:08 | 13:25:11 |
| | hyiGCNwCMxU | 14:25:12 | 14:25:47 |
| www.video.com | m3g51xfopIE | 19:41:02 | 20:13:05 |
| | 1Q-5eIBfBDQ | 22:27:36 | 23:51:07 |

In some embodiments, each day can be divided into several usage durations each including several hours. For example, 20:00 to 23:00 can be defined as the prime time, while 9:00 to 17:00 can be defined as the low usage time. As shown in the tables above, the user tends to switch between different video sources more often during the low usage time and maintain longer view time during the prime time. The core network can build different models for different usage durations to allow more accurate prediction of user behaviors.

In some embodiments, connection time for different categories of content can be tracked to determine user usage patterns based on the categories. For example, users are more likely to switch between different videos, but often continue to play a particular game for a long time. Table 4 shows example connection time of different URLs associated with a particular category of content that can be tracked by the core network in accordance with one or more embodiments of the present technology. Based on the tracked connection time within the tracking window, the core network can build one or more statistical models that represent how often the user switches between different categories of contents. In some embodiments, the core network can determine the minimum amount of connection time, the maximum amount of connection time, and/or the mean/median/average amount of connection time of a particular category of content, thereby calculating a statistical metric (e.g., the average) amount of time the user spends on the category before switching to a different type of category.

TABLE 4

Example Connection Time Associated with Content Category

| Category | URL | Start time | End time |
|---|---|---|---|
| Video | www.news.com/Z7pgn6FMVWM | 13:21:08 | 13:25:11 |
| | www.watch.com hyiGCNwCMxU | 14:25:12 | 14:25:47 |
| Game | www.game.com/m3g51xfopIE | 19:41:02 | 20:13:05 |
| | www.play.com/1Q-5eIBfBDQ | 22:27:36 | 23:51:07 |

Once the one or more statistical models are constructed based on the collected data, the core network can adaptively change the size of the payload needed for providing the streaming service. For example, the number of pre-loaded chunks for a streaming service or a particular video of the streaming service can be reduced if the model indicates that the user is highly likely to switch to a different content very soon. In some embodiments, if the model indicates a high likelihood of content switch, the core network can reduce the size of each chunks at lower layers while the application layer remains agnostic about such changes. Similarly, if the core network predicts that the user is likely to continue viewing the same content or using the same streaming service for a long time, it can adaptively increase the number or the size of the pre-loaded chunks to reduce the number of rebuffering events, thereby providing more smooth viewing experiences to the user. That is, based on different usage patterns associated with different services or contents, the actual transmission payload can be adjusted accordingly to achieve optimal usage of the network resources without interfering with the application layer control of the content play.

Computer System

Figure 4:
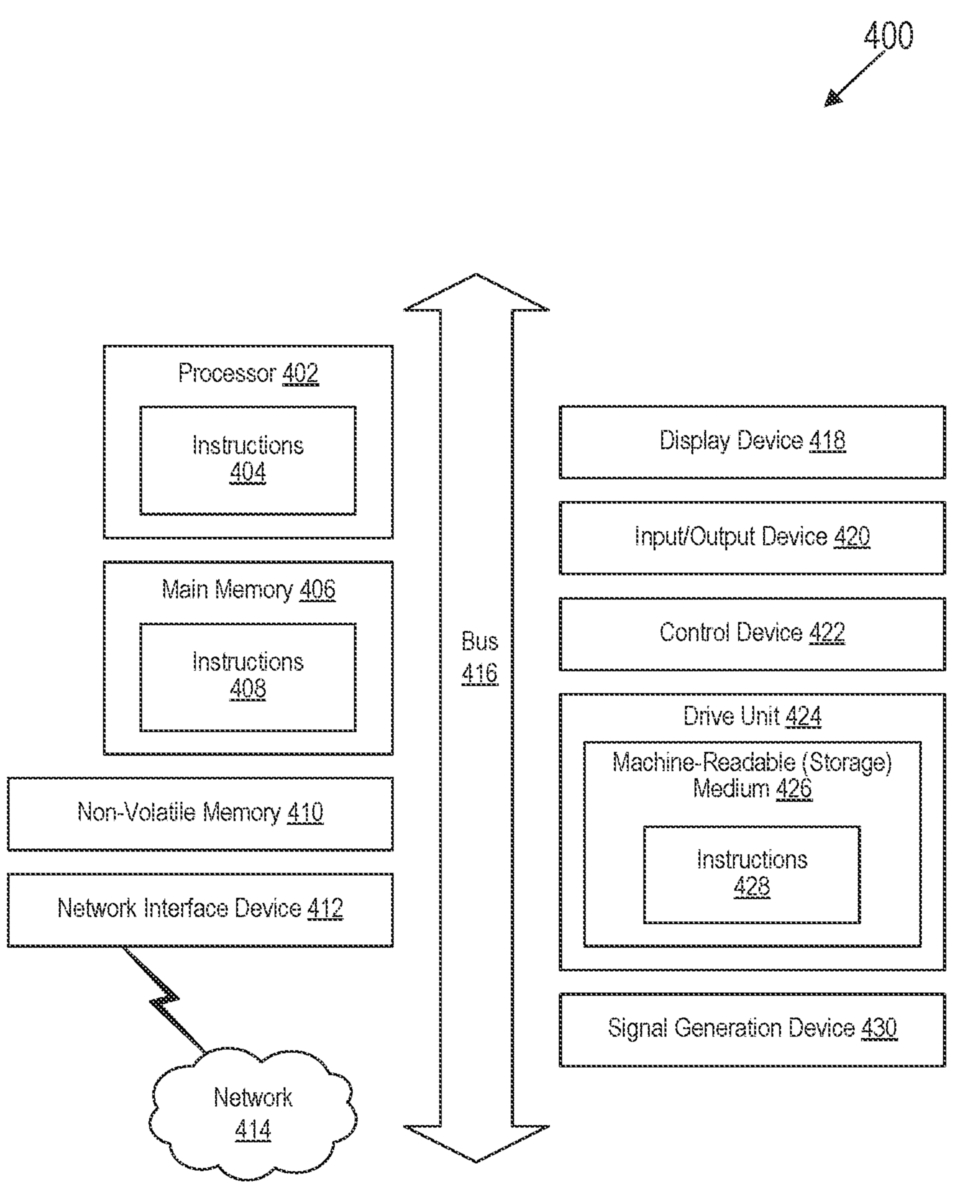
FIG. 4 is a block diagram that illustrates an example of a computer system in which at least some operations described herein can be implemented.

FIG. 4 is a block diagram that illustrates an example of a computer system 400 in which at least some operations described herein can be implemented. As shown, the computer system 400 can include: one or more processors 402, main memory 406, non-volatile memory 410, a network interface device 412, video display device 418, an input/output device 420, a control device 422 (e.g., keyboard and pointing device), a drive unit 424 that includes a storage medium 426, and a signal generation device 930 that are communicatively connected to a bus 416. The bus 416 represents one or more physical buses and/or point-to-point connections that are connected by appropriate bridges, adapters, or controllers. Various common components (e.g., cache memory) are omitted for brevity. Instead, the computer system 400 is intended to illustrate a hardware device on which components illustrated or described relative to the examples of the figures and any other components described in this specification can be implemented.

The computer system 400 can take any suitable physical form. For example, the computing system 400 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 400. In some implementation, the computer system 400 can be an embedded computer system, a system-on-chip (SOC), a single-board computer system (SBC) or a distributed system such as a mesh of computer systems or include one or more cloud components in one or more networks. Where appropriate, one or more computer systems 400 can perform operations in real-time, near real-time, or in batch mode.

The network interface device 412 enables the computing system 400 to mediate data in a network 414 with an entity that is external to the computing system 400 through any communication protocol supported by the computing system 400 and the external entity. Examples of the network interface device 412 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 406, non-volatile memory 410, machine-readable medium 426) can be local, remote, or distributed. Although shown as a single medium, the machine-readable medium 426 can include multiple media (e.g., a centralized/distributed database and/or associated caches and servers) that store one or more sets of instructions 428. The machine-readable (storage) medium 426 can include any medium that is capable of storing, encoding, or carrying a set of instructions for execution by the computing system 400. The machine-readable medium 426 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 410, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 404, 408, 428) set at various times in various memory and storage devices in computing device(s). When read and executed by the processor 402, the instruction(s) cause the computing system 400 to perform operations to execute elements involving the various aspects of the disclosure.

REMARKS

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention.

The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

What is claimed is:

1. An apparatus for wireless communication, comprising at least one processor that is configured to:
receive a message from a user device indicating a request for a network content:
determine a usage pattern of the network content based on a statistical analysis associated with the user device, wherein the statistical analysis comprises a determination of at least one of: a minimal usage duration, a maximum usage duration, a mean usage duration, a median usage duration, or an average usage duration of the network content by the user device; and
adaptively determine, based on the determined usage pattern of the network content, a payload size of a data packet associated with the network content to the user device in response to the request for the network content.

2. The apparatus of claim 1, wherein the at least one processor is configured to reduce the payload size of the data packet associated with the network content upon the usage pattern suggesting that the user device is likely to switch from the network content to a second network content.

3. The apparatus of claim 1, wherein the at least one processor is configured to identify a switch from the network content to a second network content based on a change of a Uniform Resource Locator (URL) in one or more socket calls associated with the network content or the second network content.

4. The apparatus of claim 1, wherein the at least one processor that is configured to determine, based on prior connections associated with the network content, whether a switch from the network content to a second network content is likely to be initiated by the user device.

5. The apparatus of claim 1, wherein the at least one processor is configured to determine the usage pattern of the network content based on one or more timestamps associated with a connection associated with the network content.

6. The apparatus of claim 1, wherein the at least one processor is configured to determine the usage pattern using information collected within a tracking window.

7. The apparatus of claim 1, configured to function as a User Plane Function (UPF) or a Session Management Function (SMF) in a core network.

8. A method for wireless communication, comprising:
receiving, by a network node, a communication from a user device indicating a request for a network content;

determining, by the network node, a usage pattern of the network content based on a statistical analysis associated with the user device, wherein the statistical analysis comprises a determination of at least one of: a minimal usage duration, a maximum usage duration, a mean usage duration, a median usage duration, or an average usage duration of the network content by the user device; and adaptively determining, by the network node based on the determined usage pattern of the network content, a payload size of a data packet associated with the network content to the user device in response to the request for the network content.

9. The method of claim 8, comprising:

reducing the payload size of the data packet associated with the network content upon the usage pattern suggesting that the user device is likely to switch from the network content to a second network content.

10. The method of claim 8, comprising:

identifying a switch from the network content to a second network content based on a change of a Uniform Resource Locator (URL) in one or more socket calls associated with the network content or the second network content.

11. The method of claim 8, comprising:

determining, based on prior connections associated with the network content, whether a switch from the network content to a second network content is likely to be initiated by the user device.

12. The method of claim 8, comprising:

determining the usage pattern of the network content based on one or more timestamps associated with a connection of the user device associated with the network content.

13. The method of claim 8, comprising:

determining the usage pattern using information collected within a tracking window.

14. The method of claim 8, wherein the network node comprises a User Plane Function (UPF) or a Session Management Function (SMF) in a core network.

15. A method for wireless communication, comprising:

transmitting, by a user device, a first request to a network node requesting a first network content;

receiving, by the user device, a first data packet associated with the first network content;

transmitting, by the user device after a first time duration, a second request to the network node requesting a second network content;

transmitting, by the user device after a second time duration, a third request to the network node requesting the first network content; and receiving, by the user device, a second data packet associated with the first network content, wherein a payload size of the second data packet is adaptively adjusted to be same or different as a payload size of the first data packet based on at least one of the first time duration or the second time duration and a usage pattern of the user device associated with the first network content or the second network content and wherein the usage pattern is determined based on a statistical analysis associated with the user device, the statistical analysis comprising a determination of at least one of a minimal usage duration, a maximum usage duration, a mean usage duration, a median usage duration, or an average usage duration of the first network content or the second network content by the user device.

16. The method of claim 15, comprising:

reducing a number of rebuffering events associated with the first network content based on the payload size.

17. The method of claim 15, wherein the first network content and the second network content are associated with a same streaming service.

18. The method of claim 15, wherein the first network content and the second network content are associated with different streaming services.

* * * * *